United States Patent [19]
Wu et al.

[11] Patent Number: 6,054,074
[45] Date of Patent: Apr. 25, 2000

[54] METHOD FOR MAKING MANUFACTURED AGGREGATES FROM COAL COMBUSTION BY-PRODUCTS

[75] Inventors: Muh-Cheng M. Wu, Pittsburgh; George E. Wasson, Eighty-Four, both of Pa.

[73] Assignee: Consol, Inc., Pittsburgh, Pa.

[21] Appl. No.: 09/395,537

[22] Filed: Sep. 14, 1999

Related U.S. Application Data

[63] Continuation-in-part of application No. 09/158,585, Sep. 22, 1998, abandoned.

[51] Int. Cl.$^7$ ................................................. B29C 67/02
[52] U.S. Cl. ..................... 264/37.29; 264/117; 264/122; 264/DIG. 49
[58] Field of Search ........................... 264/117, DIG. 49, 264/37.29, 122

[56] References Cited

U.S. PATENT DOCUMENTS

| | | | |
|---|---|---|---|
| 4,064,212 | 12/1977 | Kleeberg et al. | 264/117 |
| 4,343,751 | 8/1982 | Kumar | 264/117 |
| 4,377,414 | 3/1983 | Buschmann et al. | |
| 4,473,519 | 9/1984 | Hasenack . | |
| 4,490,178 | 12/1984 | Loggers et al. | |
| 4,770,831 | 9/1988 | Walker . | |
| 4,880,582 | 11/1989 | Spanjer et al. | |
| 5,037,796 | 8/1991 | Kudo et al. | |
| 5,124,104 | 6/1992 | Holley . | |
| 5,137,753 | 8/1992 | Bland et al. | |
| 5,173,232 | 12/1992 | Holley . | |
| 5,199,377 | 4/1993 | Gehrmann, III et al. | |
| 5,256,197 | 10/1993 | Smith | 264/DIG. 49 |
| 5,350,549 | 9/1994 | Boyle . | |
| 5,364,572 | 11/1994 | Wu et al. | |

*Primary Examiner*—James Derrington
*Attorney, Agent, or Firm*—Paul A. Beck & Associates

[57] ABSTRACT

This is a method of producing manufactured aggregates from coal combustion by-products having sulfur. Recycle fines containing calcium hydroxide, an aluminum-containing material, and water are mixed together to form a feed mix which is agglomerated into an agglomerated product. The agglomerated product is combined with curing fines which contain calcium oxide which together form a blended mix. The blended mix is cured using the moisture in the blended mix which is used to exothermally hydrate the calcium oxide in the blended mix to form calcium hydroxide and which autogenically provides the required heat for curing and converts the calcium oxide in the blended mix to a dry calcium hydroxide-containing material to form aggregate products and dry fines. The aggregate products are separated from the dry fines, the dry fines are recycled to the mixing step and the aggregates are taken and used as a useful product for other purposes.

12 Claims, 5 Drawing Sheets

METHOD FOR MAKING MANUFACTURED AGGREGATES FROM COAL COMBUSTION BY-PRODUCTS

CROSS REFERENCES

This application is a continuation-in-part of U.S. application Ser. No. 09/158,585 filed Sep. 22, 1998, now abandoned.

BACKGROUND OF THE INVENTION

1. Field of Invention

Aggregates, traditionally made from natural and crushed stone and sand, constitute about 80% by volume of concrete in structural materials and road construction. The consumption of natural aggregates in the United States is well over one billion tons per year. This invention relates to a process for producing manufactured aggregates from coal combustion by-product. The manufactured aggregates meet standard commercial specifications for road, lightweight and concrete aggregates, making them suitable for use in construction and agricultural applications. The replacement of natural aggregates with aggregates manufactured from coal combustion by-product could provide an opportunity for the high-volume use of and substantially expand the market for coal combustion byproduct.

Coal combustion by-product can come from a number of sources. In response to environmental concerns and regulations, many coal-fired power plants are equipped with flue gas desulfurization ("FGD") technology, particularly wet FGD systems. About 40 million tons of FGD coal combustion by-product were produced by U.S. coal-fired generating plants in 1995 and this amount could increase by an additional 40 to 70 million tons after implementation in the year 2000 of Phase 2 of the Clean Air Act Amendments of 1990. Coal combustion by-products are also produced by fluidized-bed combustion ("FBC") technology and by the thermal treatment of limestone in a coal-fired kiln to produce lime and a lime kiln dust ("LKD") by-product. The typical disposal of FGD, FBC and LKD by-product in landfills impacts the entire nation in terms of cost and land use. Utilization of these by-products as a primary component in manufactured aggregate would reduce waste disposal costs and eliminate the long-term environment liabilities presently associated with disposal.

2. Summary of Prior Art

There are a number of processes in the prior art for making manufactured aggregates or pelletizing coal combustion by-product. The prior art does not, however, teach a process that provides the significant economic and product quality advantages provided by this invention, which results in part from an innovative curing step where the required heat for the curing of the aggregate is generated by the components within the curing vessel, and where fines are converted to a hydrated lime-containing material, which is then used as a component of the aggregate feed mix to improve the strength and wear resistance of the aggregate.

U.S. Pat. No. 4,770,831 issued Sep. 13, 1988 for Process for Manufacturing a Lightweight Aggregate—Walker discloses a process for manufacturing lightweight aggregate by pelletizing or granulating a mixture of pulverized coal fly ash and lime, and curing the pellets at a temperature within the range of from 35° C. to 100° C. in an atmosphere saturated with water vapor from an external source. No curing fines are employed.

A process is described in U.S. Pat. No. 4,880,582 issued Nov. 14, 1989 for Hardening Granulated Material at Elevated Temperatures—Spanjer et al. in which granules are made by pelletizing a mix of p. c. fly ash, lime, water and other components and by embedding the pelletized products with an inert fine-grained material (e.g., fly ash) in a curing vessel at a temperature between 85° F. and 212° F. in a moist atmosphere for about 16 to 18 hours. The required heat is provided by steam injection.

U.S. Pat. No. 5,124,104 issued Jun. 23, 1992 for Coal Pond Fines Agglomeration Holley and U.S. Pat. No. 5,173,232 issued Dec. 22, 1992 for Process for Agglomerating Stack Gas Desulfurization Residue—Holley both disclose coating pellets made from FGD materials with fly ash during one stage of pellet formation by disk pelletizing to facilitate handling and transportation. Unlike the present invention, the patents do not involve aggregate manufacture, curing at elevated temperatures or chemical alteration of the pellets or the use of curing fines heat generation. Construction-grade aggregates can not be produced in these disclosures.

U.S. Pat. No. 5,137,753 issued Aug. 11, 1992 for Pelletizing Ash—Bland et al. discloses pelletizing calcium oxide-containing FBC fly ash after mixing with water and curing the pelletized products by coating with a separately prepared, non-reactive hydrated FBC bed ash to create a low strength pellet for easy disposal. The disclosure is limited to FBC material only. Hydrated FBC bed ash is produced by mixing FBC bed ash with water and converting a substantial portion of the calcium oxide in the FBC bed ash to hydrated lime. The reactivity of the FBC bed ash with water varies, however, with its size distribution. This characteristic can result in an excessive moisture content after hydration and induce bridging problems or uncontrolled agglomeration during curing, which caused the failure of the process when demonstrated at the U.S. Generating Cedar Bay FBC Facility in Jacksonville, Fla. in 1995. In the present invention, manufactured aggregates are produced from a variety of sulfur-containing materials, including wet and dry FGD and FBC materials. Dry fines consisting of p. c. fly ash and fine quick lime are used as the curing medium. The fines remain dry with a moisture content of 5% or less, eliminating the potential bridging problem associated with excessive moisture content and keeping the materials free flowing.

U.S. Pat. No. 5,350,549 issued Sep. 27, 1994 for Synthetic Aggregate Compositions Derived From Spent Bed Materials From Fluidized Bed Combustion and Fly Ash—Boyle discloses a process for making lightweight aggregates from a blend of FBC bed ash and pulverized coal (p.c.) fly ash. The blend is mixed with water and then formed into a shaped article, such as a pellet or a brick, that is later crushed. The shaped articles are cured at ambient temperature while saturated with water for several days.

U.S. Pat. No. 5,364,572 issued Nov. 15, 1994 for Process for Making High-Strength Synthetic Aggregates—Wu et al. discloses a process for making construction-grade aggregates including hydrating calcium oxide-containing coal combustion by-product (e. g., FBC by-product) for a sufficient period of time (5–25 minutes) to convert at least 80% of the calcium oxide to calcium hydroxide prior to forming pellets and curing the pellets at elevated temperature and high humidity with steam addition. Wu does not use curing fines or provide for autogenic heating.

U.S. Pat. No. 4,490,178 issued Dec. 25, 1984 for Granulated Material Loggers et al. discloses a process for forming granulates by simultaneously mixing water, calcium oxide, and fly ash at elevated temperature. The present invention is distinctly different in that recycle fines containing calcium hydroxide, combustion by-product containing sulfur, aluminum-containing material, and water are blended to from a feed mix. The feed mix then is agglomerated and cured to produce a manufactured product.

U.S. Pat. No. 4,064,212 issued Dec. 20, 1977 for Method of Making Pellets Usable as Aggregate or Filler—Kleeberg et al. discloses a process for making aggregate by pelletizing a mix of FGD sludge, fly ash, and a binder, and drying the pelletized products for aggregate production. The water from the sludge is decanted to reduce the moisture content between 20% and 40%, and the sludge moisture content is reduced between 10% to 20% by heating the concentrated sludge before mixing. No curing fines or embedding material is employed in the curing step. External heating, provided either by a rotary dryer or by the hot flue gas, is used to dry the pelletized products for aggregate production. There are several distinct differences between Kleeberg's patent and the present invention. In the present invention, water content of FGD sludge is not limited to 40% or below. The curing step in the present invention is a chemical reaction process driven by the heat generated autogenically by the in situ hydration of CaO, which is added as a component of curing fines prior to the curing step. Autogenic curing with curing fines has the unexpected benefit of providing a uniform heat release and temperature throughout the curing vessel, which results in the production of aggregates of superior physical characteristics for use in construction.

U.S. Pat. No. 5,256,197 issued Oct. 26, 1993 for Abrasion-Resistant Synthetic Article and Method of Making—Smith discloses a process for making solid article or aggregate by mixing fly ash, lime, water, and FGD sludge, and compressing the mixed products at pressures exceeding 1,000 psi, preferably 4000–8000 psi. The compressed products are cured for at least the equivalent of 28 days at 73° F., crushed and sized to produce aggregates. The present invention is distinct because it operates at ambient pressure and uses autogenic heating to cure the product.

U.S. Pat. No. 4,343,751 issued Aug. 10, 1982 for Clay Agglomeration Process Kumar discloses a process in which clay fines alone or in combination with other materials (e.g. fly ash) are agglomerated, dried, and screened for production of end products. Pellets are formed in intensive mixer agglomerators. External heating, provided by Turbo-stack drying systems, is used to reduce pellet moisture content and the tendency of the pellets to coalesce. No curing fines or embedded material is employed in the drying step in this patent.

DEFINITION OF TERMS

AASHTO—American Association of State Highway and Transportation Officials.
Agglomerated product—Product made from processing of fine particles in a feed mix by briquetting, pelletizing, extruding, or other size-enlargement methods.
Agglomerating—Processing fine particles in a feed mix to form a shaped mass.
Agglomeration—A size-enlargement process to make or form a shaped mass from fine particles in a feed mix.
Aluminum-containing material—Fly ash, coal ash, portland cement, or other materials which contain aluminum.
ASTM—American Society for Testing and Materials
Autogenically—Independently of external aid or influence, self-generated.
Blended mix—The mixture of agglomerated product and curing fines prior to curing.
Combustion by-product—Fly ash, bottom ash, boiler slag, or other solid material remaining from the combustion of coal. Also, wet FGD sludge, wet lime kiln dust, dry lime kiln dust, dry FGD waste, FGD gypsum, or FBC waste.
Curing—A processing step during which an agglomerated product is chemically converted to an aggregate
Curing fines—A CaO-containing material that is mixed with agglomerated product to produce autogenic heat for curing.
Curing vessel—A vessel in which the agglomerated product is converted to manufactured aggregate.
Dry calcium hydroxide-containing material—Material produced from the curing fines.
Dry FGD material—Dry material generated from a spray dryer, LIMB, or other processes. The components can include fly ash, calcium sulfite ($CaSO_3$), calcium sulfite hemi-hydrate ($CaSO_3$—$\frac{1}{2}H_2O$), anhydrous calcium sulfate ($CaSO_4$), and calcium carbonate ($CaCO_3$).
Dry lime kiln dust—Dry material collected from a particulate collection device (baghouse or ESP) at a lime kiln. The component can include calcium oxide (CaO), calcium carbonate ($CaCO_3$) and coal ash.
ESP—Electrostatic precipitator.
Exothermally—Describing a chemical reaction which releases heat, such as $CaO+H_2O \rightarrow Ca(OH)_2 +$ heat.
External source of heat—Heat supplied from an external source, such as steam, hot air, sunlight, etc.
FBC—Fluidized-bed combustion.
FBC by-products—Dry material collected from fluidized-bed combustion. The major components are calcium sulfate ($CaSO_4$), calcium oxide (CaO), and coal ash. Minor components include calcium carbonate ($CaCO_3$).
FBC waste—Dry material from fluidized-bed combustion. The components can include anhydrous calcium sulfate ($CaSO_4$), calcium oxide (CaO), coal ash, and calcium carbonate ($CaCO_3$).
FGD—flue gas desulfurization.
FGD gypsum—Calcium sulfate dihydrate ($CaSO_4.2H_2O$) generated from a forced-oxidation wet limestone scrubber.
Feed mix—The mixture of recycle dry fines, combustion by-product, aluminum-containing material, and water prior to agglomerating.
Fly ash—Solid waste generated from pulverized coal (p.c.) combustion and collected in the cyclones, baghouse, ESP, or similar dry collection device.
Hydrated lime—calcium hydroxide ($Ca(OH)_2$).
LKD—lime kiln dust
LOI—loss on ignition.
Manufactured aggregates—Materials produced by agglomeration and curing with properties that meet standard specifications for construction aggregates (e.g. AASHTO, ASTM).
Mixing—A process step to blend the feedstocks (combustion by-product, recycle dry fines, and aluminum-containing material, and water) to form a feed mix prior to agglomeration.
P.C. fly ash—pulverized coal fly ash with a moisture content of 5% or below, which is generated from coal combustion. The major elemental components are aluminum and silicon. Minor elemental components include iron, calcium, sodium, potassium, carbon, and other trace components.
Pelletized products (or pellets)—A shaped material produced by agglomeration.
Providing water—Adding water during mixing of dry coal combustion by-product, such as FBC or spray dryer waste, or water provided by wet FGD sludge.
Quick lime—calcium oxide (CaO).
Recycle dry fines—A $Ca(OH)_2$-containing fine material generated during curing.

Spray dryer ash—A dry FGD material generated from the spray dryer process, a dry FGD process.

Wet FGD sludge—The by-product generated from a wet lime or limestone scrubber with a moisture content of 20% to 60%. The components can include calcium sulfite hemi-hydrate ($CaSO_3 \cdot \frac{1}{2}H_2O$), calcium sulfate dihydrate or gypsum ($CaSO_4 \cdot 2H_2O$), calcium carbonate ($CaCO_3$) and fly ash.

Wet lime kiln dust—By-product produced from a wet scrubber installed to reduce particulate emissions from a lime kiln. The components can include calcium hydroxide ($Ca(OH)_2$), calcium carbonate ($CaCO_3$), and fly ash.

SUMMARY OF THE INVENTION

We provide a method of producing manufactured aggregates from combustion byproduct. Combustion by-product containing sulfur are combined with recycle dry fines containing calcium hydroxide, an aluminum-containing material, and water. We mix the recycle dry fines containing calcium hydroxide, combustion by-product, aluminum-containing material, and the water to form a feed mix. We then agglomerate the feed mix into an agglomerated product. We then combine the agglomerated product with curing fines which contain between 5%–30% calcium oxide by weight of the curing fines and this produces a blended mix. We then cure the blended mix in a curing vessel to form aggregates and create recycled dry fines for recycling, during which moisture in the blended mix exothermally hydrates calcium oxide in the blended mix to form a dry calcium hydroxide-containing material and autogenically provides all of the required heat for curing and no external source of heat is required. We then separate the aggregates and the recycle dry fines and we then recycle the recycle dry fines which contain calcium hydroxide to the mixing step and the cycle is repeated.

We preferably provide that the combustion by-product comprises wet flue gas desulfurization sludge, and that the aluminum-containing material comprises p.c. fly ash. The mixing to form the feed mix is conducted in a high-intensity mixer at ambient temperature. The agglomerating step includes pelletizing. The agglomerated product is combined with the curing fines in a ratio of agglomerated product to curing fines in a range from 9:1 and 3:2 by weight and the curing fines comprise calcium-oxide materials and dry pulverized coal fly ash. The blended mix is cured at 90% or higher humidity at a temperature between 140° F. and 220° F. The aggregate products are separated from the dry fines by screening techniques. The calcium oxide in the curing fines is converted to calcium hydroxide during the curing step prior to recycling of the dry fines.

We further provide that the sulfur and aluminum-containing material comprises dry flue gas desulfurization by-product such as spray dryer ash.

We also provide that the combustion by-product material comprises a mix of wet lime kiln dust and dry lime kiln dust in which the calcium hydroxide is at least 70% by weight of the feed mix and in which the aluminum-containing material is fly ash containing less than 10% aluminum by weight of the feed mix and in which the aggregates formed from the curing step are agricultural aggregates.

We further provide that the combustion by-product comprises fluidized-bed combustion by-product and the aluminum-containing material comprises p.c. fly ash wherein the mixing to form the feed mix is conducted for a period of five to twenty-five (5–25) minutes at a temperature of 120° F. to 220° F.

We further provide that the combustion by-product comprises wet flue gas desulfurization sludge and the aluminum-containing material comprises pulverized coal fly ash with a loss on ignition of greater than 10% or a specific gravity of lower than 2.10 wherein the product produced is lightweight aggregate.

DESCRIPTION OF THE PREFERRED EMBODIMENT

Production of Manufactured Aggregates from Wet FGD Sludge

Figure 1:
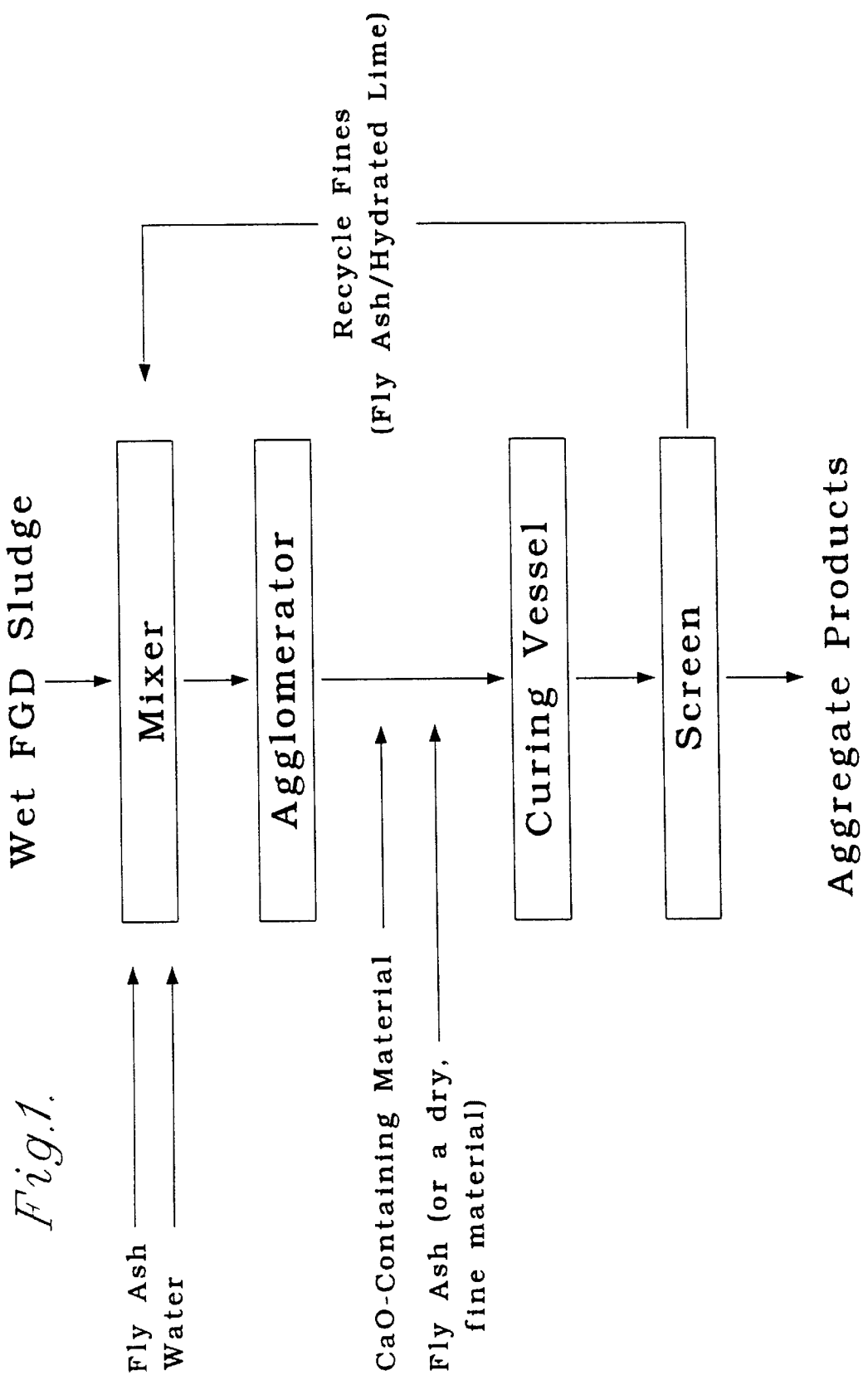
FIG. 1 Illustrates the process flow chart for the production of aggregates from wet FGD sludge.

FIG. 1 presents the process to produce manufactured aggregates from wet FGD sludge, p. c. fly ash, recycle fines (fly ash and hydrated lime) and water. In this process, the ingredients are mixed in a high intensity mixer at ambient temperature. The mixed material is agglomerated on a rotary disk pelletizer. A slight amount of additional water may be added to facilitate agglomeration. As the green pellets roll from the disk pelletizer and are transferred to the curing vessel, curing fines consisting of fine quicklime (CaO) and p. c. fly ash are mixed with the pellets. The total amount of curing fines should be between 11 and 67 wt % based on weight of pellets. The amount of quick lime in the curing fines should be between 5 and 30 wt % based on the total weight of curing fines.

The dry fines have the following functions: (1) CaO in the curing fines reacts exothermally with moisture in the pellets to form $Ca(OH)_2$ while in the curing vessel, thus, generating heat in-situ to cure the pellets autogenically and eliminating the requirement of an external heat source, (2) curing fines cushion the green pellets, thus preventing them from breaking during transfer from the pelletizer to the curing vessel, and (3) curing fines cover the pellets, thus preventing the pellets from sticking together in the curing vessel. The temperature in the curing vessel can be controlled by the amounts of quick lime and fly ash added to the pellets before charging to the curing vessel. Autogenic heating ensures a uniform temperature throughout the curing vessel resulting in a product of superior strength and durability as needed for construction use. Most of the CaO in the curing fines is hydrated to $Ca(OH)_2$ in the curing vessel. The surfaces of all solids in the curing vessel remain dry; therefore, the solids remain free flowing.

After separation from the curing fines (e.g., by screening), the cured pellets are suitable for use as construction aggregate. After separation, the hydrated fines are recycled back to the mixer as the hydrated lime component in the feed mix for pellet production. Hydration of the CaO in the curing fines to $Ca(OH)_2$ during the curing step is particularly beneficial because the hydrated lime is a superior feed stock for this process in that it provides a product with the strength and wear resistance necessary for use in construction.

Production of Manufactured Aggregates from Spray Dryer Ash

Figure 2:
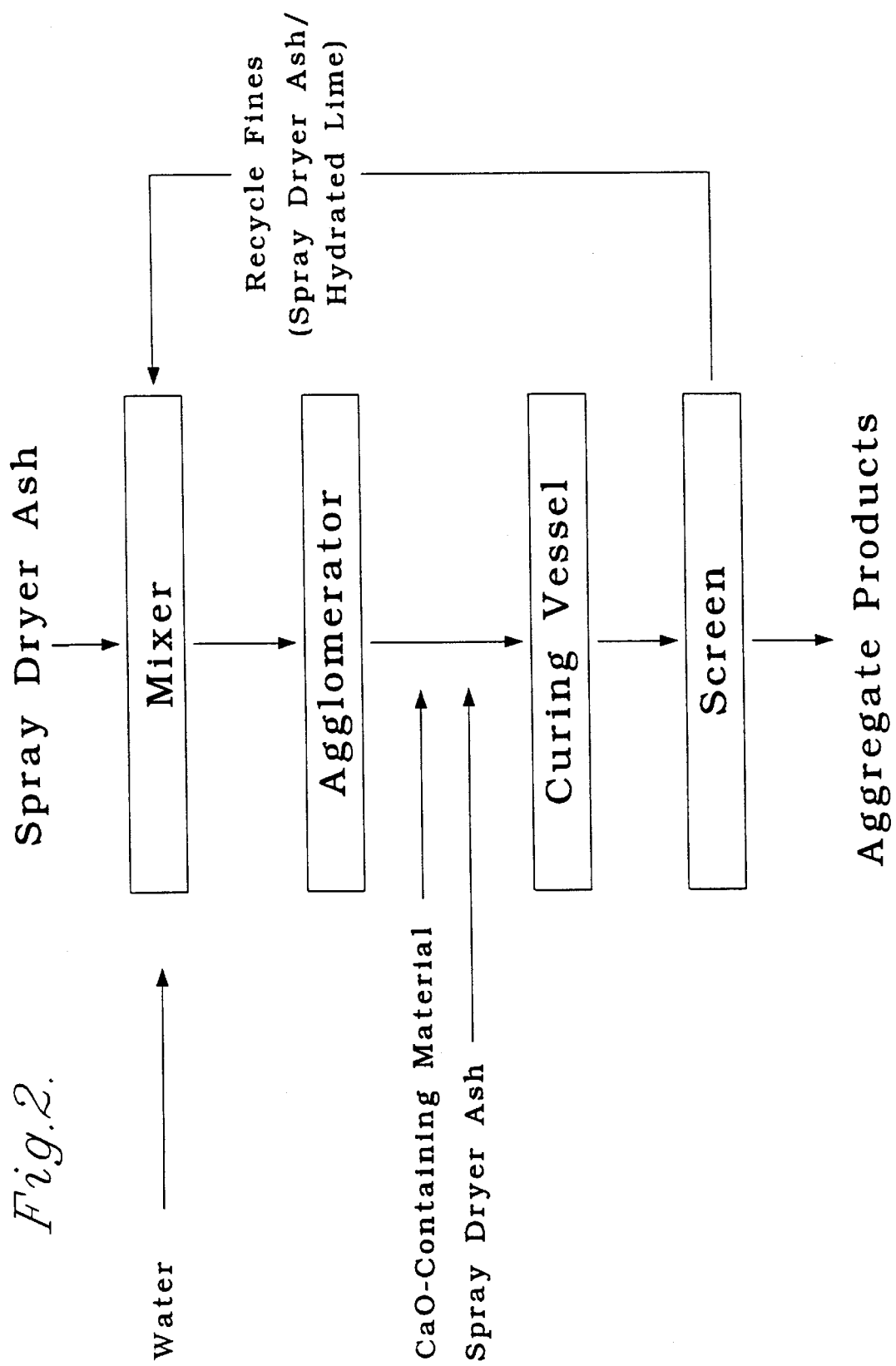
FIG. 2 Illustrates the process flow chart for the production of aggregates from spray dryer ash.

FIG. 2 presents a process to produce manufactured aggregates from spray dryer ash, recycle material (spray dryer ash and hydrated lime) and water. The process is similar to that in FIG. 1 except that curing is conducted with coating fines containing a blend of spray dryer ash and a calcium oxide-containing material (e. g., lime, FBC byproducts).

Production of Manufactured Aggregates from Wet Lime Kiln Dust

Figure 3:
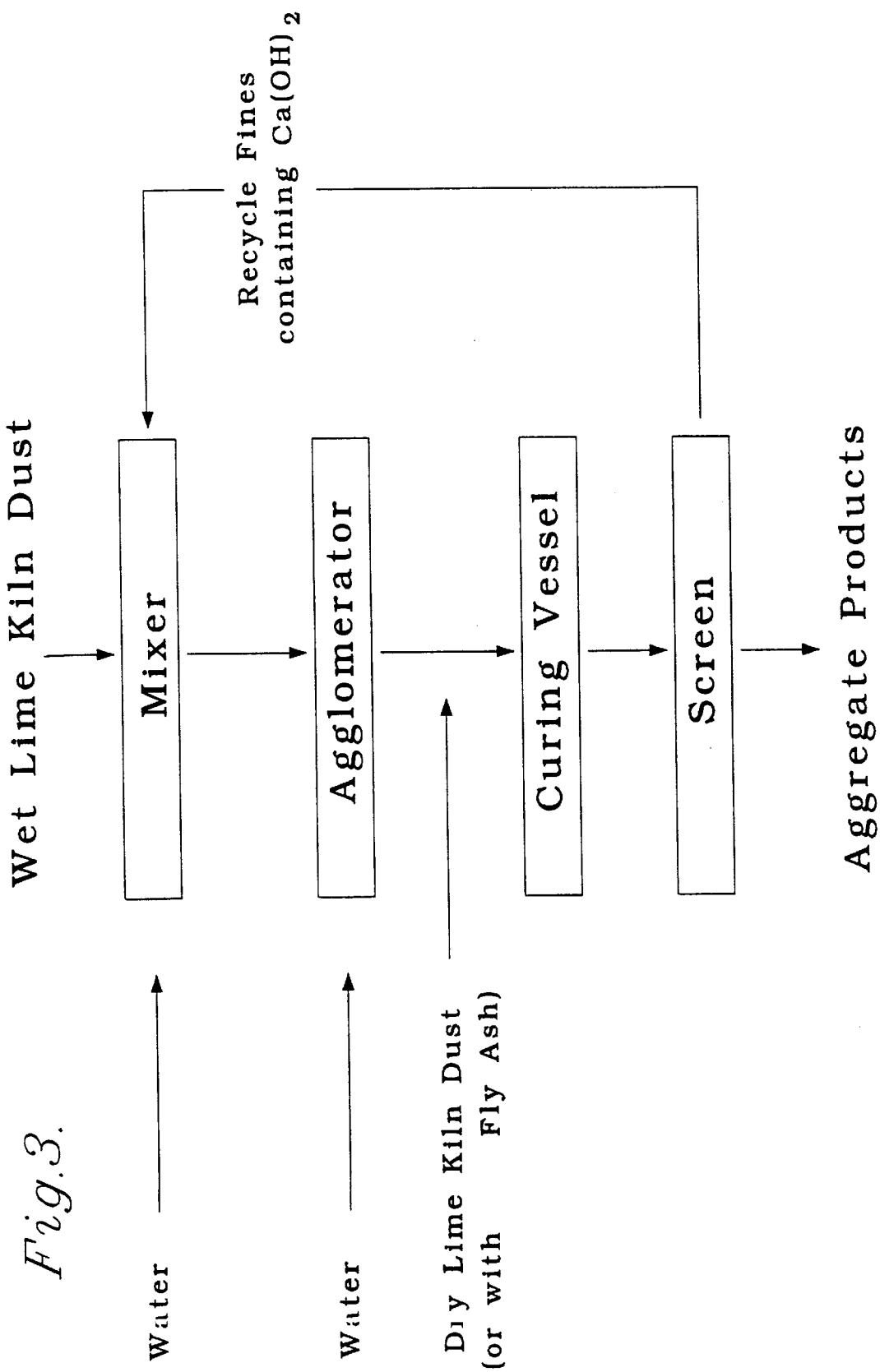
FIG. 3 Illustrates the process flow chart for the production of aggregates from wet lime kiln dust.

FIG. 3 presents a process to produce manufactured agricultural aggregate from a mix of wet lime kiln dust, dry lime kiln dust and water. Wet lime kiln dust and dry lime kiln dust are by-product collected from wet scrubber and dry collection (baghouse or ESP) devices to reduce particulate emissions from a kiln at a lime production plant. In this invention, the kiln is coal-fired and the kiln dust contains coal ash. The process is similar to that in FIG. 1 except that curing is conducted with curing fines which contain dry lime kiln dust (with an option of the addition of p. c. fly ash) to provide the heat for curing.

Production of Manufactured Aggregates from FBC By-product

Figure 4:
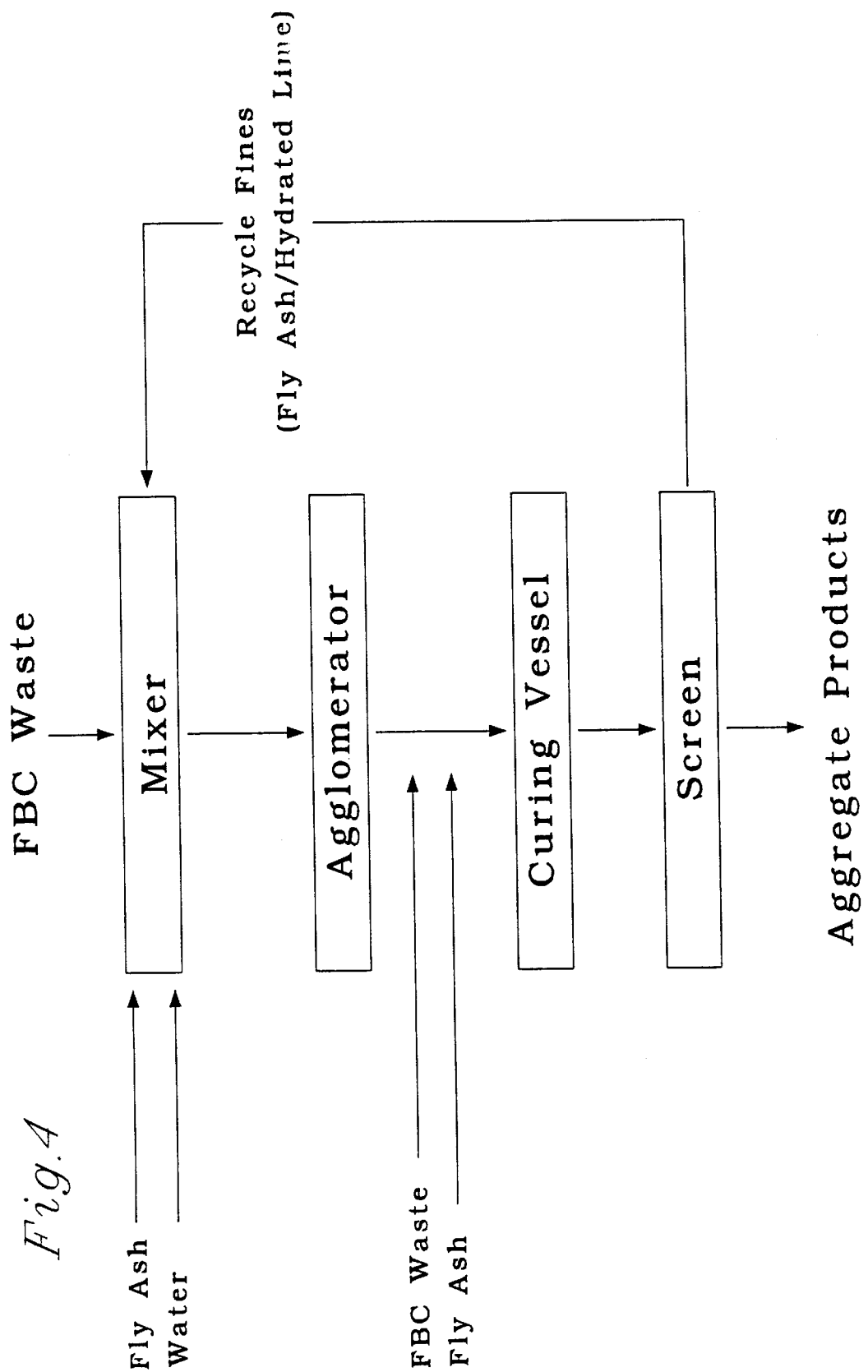
FIG. 4 Illustrates the process flow chart for the production of aggregates from FBC waste.

FIG. 4 presents a process to produce manufactured aggregates from a mix of FBC by-product, recycle fines (hydrated FBC by-product and p. c. fly ash) and water. In order to hydrate over 80% of the CaO present in the FBC by-product, the mixing temperature must be maintained at a temperature of 120° F. to 200° F. for a period of 5 to 25 minutes. The curing step is similar to that in FIG. 1 except that the curing fines contain a blend of FBC by-product and p. c. fly ash.

Figure 5:
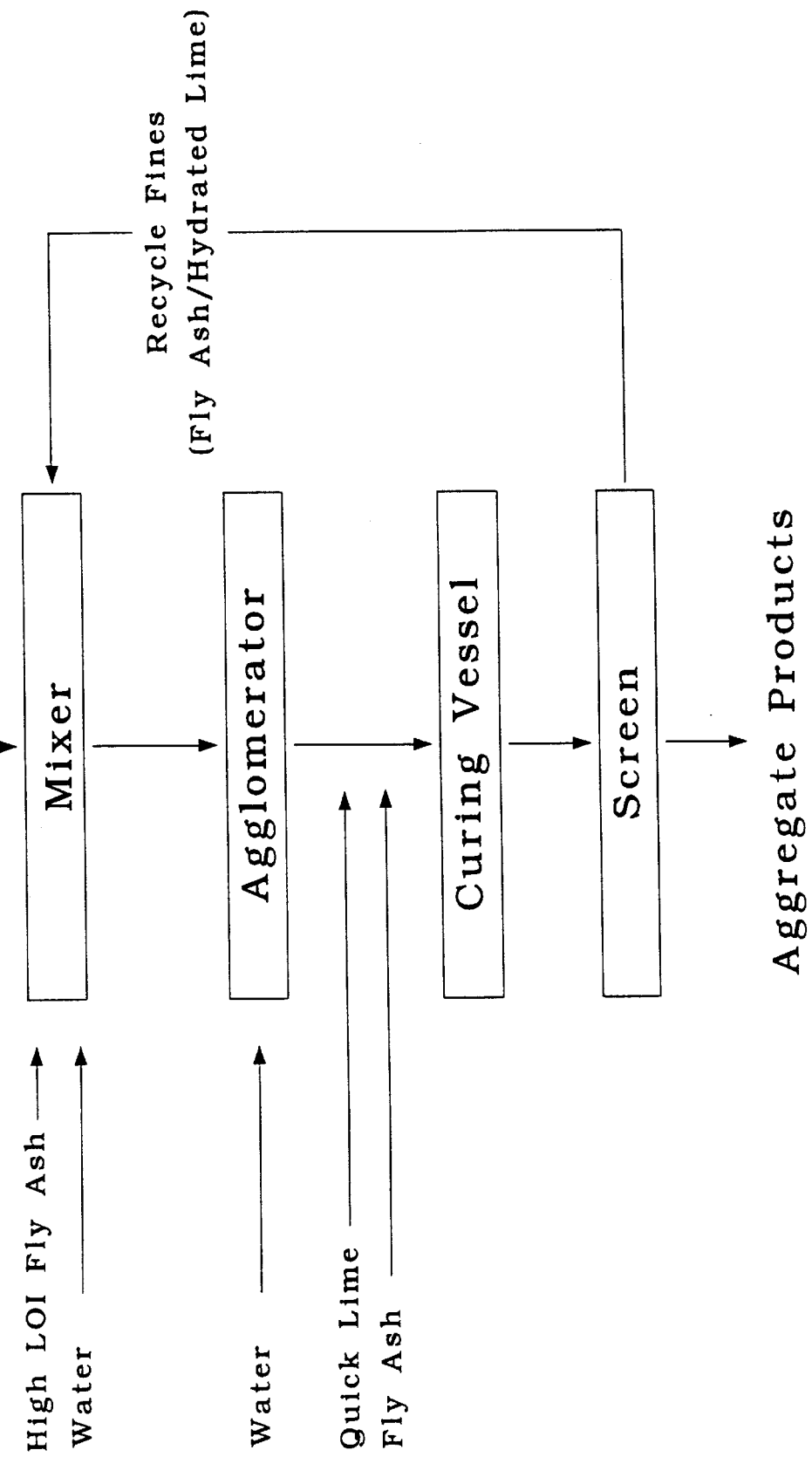
FIG. 5 Illustrates the process flow chart for the production of aggregates from wet FGD sludge and high LOI fly ash.

Production of Lightweight Aggregates from Wet FGD Sludge and Low Specific Gravity Fly Ash FIG. 5 describes a process to produce lightweight aggregates from wet FGD sludge, p. c. fly ash and recycle fines (p. c. fly ash and hydrated lime). The fly ash must have a minimum LOI content of 10% and a maximum specific gravity of 2.10. The process is similar to that in FIG. 1, except that a high LOI or a low specific gravity fly ash is used to produce lightweight aggregate.

EXAMPLE 1

High-strength manufactured aggregates were produced from a mix of lime wet FGD sludge, p. c. fly ash, hydrated lime ($Ca(OH)_2$) and water. The mix formulation had a fly ash/wet FGD sludge/hydrated lime wt. ratio of 49.8/45.5/4.7. The lime wet FGD sludge contained 54 wt % solids. The ingredients were mixed and then agglomerated in a rotary disk pelletizer. After blending with 30% fines, the pelletized products were cured in a curing vessel at 160 to 170° F. and over 90% relative humidity for 24 hr without the addition of steam. The fines contained 85 wt % fly ash and 15 wt % quick lime (CaO). More than 90% of the CaO in the fines was hydrated to $Ca(OH)_2$ during the curing process. The fines and the manufactured aggregates produced were readily separated with a series of screens ranging from 1" to 8 mesh. 90 wt % of the aggregates had sizes between ¾" and 4 mesh. The manufactured aggregates produced had an average compressive strength of 136±45 lb and a "Los Angeles Abrasion Index" (wear resistance) of 31.2% (ASTM C-131, Grading C). The LA abrasion index meets the AASHTO Class A aggregate requirement for use in road construction.

For comparison, much weaker aggregates were produced when quick lime (CaO) was used in the mix rather than hydrated lime ($Ca(OH)_2$). The mixed ingredients were agglomerated and cured in the same manner as in the above test. 70% of the aggregates had sizes between ¾" and 4 mesh. The manufactured aggregates produced had an average compressive strength of 42±15 lb and an LA abrasion index of 56.6% (ASTM C-131, Grading C). The LA abrasion index fails to meet the AASHTO Class A aggregate requirement for use in road construction. Both compressive strength and LA abrasion index data indicate that the quality of the manufactured aggregates produced is improved when hydrated lime rather than quick lime is used as the alkaline material.

EXAMPLE 2

High-strength manufactured aggregates were produced from a mix of lime wet FGD sludge, p. c. fly ash, hydrated lime ($Ca(OH)_2$) and water. The mix formulation used in this test was the same as the first test in Example 1 except that hydrated lime and part of the fly ash were provided from the recycle fines obtained in the second test of Example 1. The scheme in which recycle fines represent the finer than 8 mesh portion of the screened materials after the curing step is illustrated in FIG. 1. Thermogravimetric analysis (TGA) indicated that the quick lime contained in the fresh fines was converted to hydrated lime during curing. 89% of the aggregates had sizes between ¾" and 4 mesh. The manufactured aggregates produced had an average compressive strength of 129±34 lb and an LA abrasion index of 34.2% (ASTM C-131, Grading C). The aggregates produced with recycle fines had similar strength and LA abrasion index as those produced with direct addition of hydrated lime in the feed mix (first test in Example 1).

EXAMPLE 3

High-strength manufactured aggregates were produced from a mix of lime wet FGD sludge, p. c. fly ash, hydrated lime ($Ca(OH)_2$) and water. The mix formulation had a fly ash/wet FGD sludge/hydrated lime weight ratio of 54.1/40.3/5.6. The lime wet FGD sludge contained 42 wt % solids. The procedures used to produce manufactured aggregate were similar to those in the first Test in Example 1. The manufactured aggregates produced had an average compressive strength of 121±36 lb, a unit weight of 73.0 $lb/ft^3$, an LA abrasion index of 40% (ASTM C-131, Grading B) and a sodium sulfate soundness index of 1%. 73% of the aggregates had sizes between ¾" and 4 mesh. The aggregates produced meet the AASHTO Class A coarse aggregate specifications for unit weight, LA abrasion index, soundness index and grain size.

EXAMPLE 4

High-strength manufactured aggregates were produced from a mix of FGD gypsum from a limestone wet FGD scrubber, p. c. fly ash, hydrated lime and water. The mix formulation had a fly ash/wet FGD gypsum/hydrated lime weight ratio of 51.9/35.3/12.8. The FGD gypsum contained 82 wt % solids. The procedures used to produce the manufactured aggregates were similar to those in the first test in example 1. The manufactured aggregates produced had an average compressive strength of 76±33 lb, a unit weight of 74.7 $lb/ft^3$, an LA abrasion index of 45% (ASTM C-131, Grading C), a sodium sulfate soundness index of 3.1% and a clay lumps content of 0.85%. 72 wt % of the aggregates had sizes between ¾" and 4 mesh. The aggregates meet the ASTM C-33 specifications for use as coarse concrete aggregate.

EXAMPLE 5

Lightweight aggregates were produced from wet FGD sludge from limestone wet FGD sludge, hydrated lime and fly ash with an LOI content of 12%. The mix formulation had a fly ash/wet FGD sludge/hydrated lime wt ratio of 50.4/43.8/5.8. The aggregates produced had an average compressive strength of 72±20 lb, a unit weight of 55.0 lb/ft$^3$ (dry basis), and a clay lumps content of 1.1%. Lightweight aggregates were also produced from the same mix except that a fly ash with a LOI content of 22% was used. The aggregates produced had an average compressive strength of 71±19 lb, a unit weight of 52.1 lb/ft$^3$ (dry basis) and a clay lumps content of 1.2%. Aggregates from both operations meet the ASTM C-331 lightweight aggregate specifications for unit weight (55 lb/ft$^3$) and clay lumps (2% max.).

EXAMPLE 6

Lightweight aggregates were produced from a mix of FGD gypsum from a limestone wet scrubber, hydrated lime and a fly ash with a LOI content of 22%. The mix formulation had a fly ash/FGD gypsum/hydrated lime weight ratio of 50.4/43.8/5.8. The aggregate produced had an average compressive strength of 154±60 lb, a unit weight of 49.1 lb/ft$^3$ (dry basis), and a clay lumps content of 1.5%. The aggregates produced meet ASTM C-331 lightweight aggregate specifications for unit weight and clay lumps content.

It is understood that various modifications could be made in the present invention without departing from the main teaching of it.

We claim:

1. Method of producing manufactured aggregates from a combustion by-product comprising:

(a) providing combustion by-products which contain sulfur;
   (b) providing recycle dry fines containing calcium hydroxide (Ca(OH)$_2$);
   (c) providing an aluminum-containing material;
   (d) providing water;
   (e) mixing the recycle dry fines containing calcium hydroxide, combustion by-product, aluminum-containing material, and the water to form a feed mix; then
   (f) agglomerating the feed mix into an agglomerated product; then
   (g) combining the agglomerated product with curing fines which contain calcium oxide and which produces a blended mix; then
   (h) curing the blended mix to form the aggregates and create recycle dry fines for recycling, during which moisture in the blended mix exothermally hydrates calcium oxide in the blended mix to form a dry calcium hydroxide-containing material and autogenically provides all of the required heat for curing and no external heat is required; then
   (I) separating the aggregates and the recycle dry fines; and
   (j) recycling the recycle dry fines containing calcium hydroxide to the mixing step.

2. The method as recited in claim 1 wherein the combustion by-product comprises wet flue gas desulfurization sludge and the aluminum-containing material comprises pulverized coal (p. c.) fly ash.

3. The method as recited in claim 1 wherein the mixing to form the feed mix is conducted in a high-intensity mixer at ambient temperature.

4. The method as recited in claim 1 wherein agglomerating the feed mix into an agglomerated product includes pelletizing.

5. The method as recited in claim 1 wherein the agglomerated product is combined with the curing fines in a ratio of agglomerated product to curing fines in a range from 9 to 1 and 3 to 2 by weight, and wherein the curing fines comprises calcium-oxide materials and dry pulverized coal fly ash.

6. The method as recited in claim 1 wherein the blended mix is cured at 90% or higher humidity and at a temperature of between 140° F. and 220° F.

7. The method as recited in claim 1 including converting calcium oxide in the curing fines to calcium hydroxide during the curing step prior to recycling the recycle dry fines.

8. The method as recited in claim 1 wherein the sulfur and aluminum-containing material comprises dry flue gas desulfurization by-product.

9. The method as recited in claim 1 wherein the combustion by-product comprises a mix of wet lime kiln dust and dry lime kiln dust and in which the calcium hydroxide is at least 70% by weight of the feed mix.

10. The method as recited in claim 1 wherein the combustion by-product comprises a mix of wet lime kiln dust and dry lime kiln dust and in which the calcium hydroxide is at least 70% by weight of the feed mix and in which the aluminum-containing material is fly ash containing less than 10% aluminum by weight of the feed mix and in which the aggregates formed from the curing step are agricultural aggregates.

11. The method as recited in claim 1 wherein the combustion by-product comprises fluidized-bed combustion by-product and the aluminum-containing material comprises pulverized coal fly ash and wherein the mixing to form the feed mix is conducted for a period of 5 to 25 minutes at a temperature of 120° F. to 220° F.

12. The method as recited in claim 1 wherein the combustion by-product comprises wet flue gas desulfurization sludge and the aluminum-containing material comprises pulverized coal fly ash with a loss on ignition of greater than 10% or a specific gravity of lower than 2.10 and wherein the product is lightweight aggregate.

* * * * *